United States Patent [19]

Grantham

[11] Patent Number: 4,839,986
[45] Date of Patent: Jun. 20, 1989

[54] GRAFTING APPARATUS

[76] Inventor: Debs E. Grantham, 4603 County Rd. 63, Rosharon, Tex. 77583

[21] Appl. No.: 169,626

[22] Filed: Mar. 18, 1988

[51] Int. Cl.$^4$ .............................................. A01G 1/00
[52] U.S. Cl. .............................................. 47/6; 47/8; 30/90.4
[58] Field of Search .......................... 47/6, 7, 8, 1.41; 30/495, 90.4, 278; 81/9.4

[56] References Cited

FOREIGN PATENT DOCUMENTS 2493618  5/1982  France ................................. 30/90.4
607389  12/1978  Switzerland ........................... 30/90.4

Primary Examiner—Richard J. Johnson
Assistant Examiner—Milan K. Shepel
Attorney, Agent, or Firm—Darryl M. Springs

[57] ABSTRACT

A hand-held tool for making grafting-flap cuts in the bark of a tree limb includes an elongated tubular body having an open end for accommodating coaxial insertion of the limb. The end of the body adjacent the open end has a plurality of elongated slots longitudinally disposed in the tubular body. A plug within the tubular body limits the insertion depth of the limb to a preselected distance. A plurality of elongated knife members are provided. The longitudinal axis of each of the knife members registers with the longitudinal axis of one of the circumferentially spaced slots in said tubular body. The knife members are supported by a support ring radially projecting above the outer surface of the tubular body and are disposed in a corresponding plurality of radially projecting circumferentially equally-spaced slots in the support ring. An elastic band is coaxially disposed about the tubular body and engages the other ends of the knife members for biasing the other ends radially inwardly towards the tubular body. The handle end of the body is externally threaded and a collar nut, internally threaded, is adapted for threadably mating with the handle end. The nut has a shoulder angle selected for engaging a cam surface on the other ends of the knife members for applying an outward force thereto for camming the other ends of the knife members upwardly to pivot the knife edges downwardly through the registering slots into piercing contact with the limb.

26 Claims, 1 Drawing Sheet

GRAFTING APPARATUS

BACKGROUND OF THE INVENTION

The present invention relates to a grafting tool for grafting selected growth to a plant or tree limb. The apparatus is more particularly directed to precisely cutting slits in the bark of a tree limb for executing a "banana" graft or a 3- or 4-flap graft for grafting new selected growth to pecan or fruit trees.

It has become popular to graft desirable pecan (or fruit) wood to other less desirable root or base stock by using a technique termed a "banana" graft or a "3- or "4-flap" graft. In this technique, a limb of the root or base stock, generally 0.5 inches to about 1.25 inches in diameter, is cut cleanly at right angles to the longitudinal axis of the tree limb or trunk at the point where the graft is desired. Three (3) or four (4) longitudinally straight slits are cut in the bark of the limb or trunk. The longitudinal slits are evenly spaced circumferentially about the limb, and then the bark between adjacent slits is peeled back as a single flap to provide a plurality of such flaps, depending on the size of the limb or trunk and the preference of the one doing the grafting.

The inner wood of the limb or trunk is then cut away at a right angle to the limb axis at the base of the peeled back flaps. The limb of the desired graft wood is selected to be generally equal in diameter to the diameter of the limb or trunk into which the slits were made. The bark is removed from an area adjacent the end of the desirable graft wood for a distance equal to the length of the flaps on the base wood limb. The exposed end of the desired graft wood limb is positioned in an abutting relationship to the severed end of the base wood limb, and the peeled back bark flaps are repositioned to encircle the exposed end of the desirable graft wood limb. The bark flaps are taped in place and the entire graft area is covered and sealed to protect the graft wound.

To make consistent grafts having a high degree of probability of success, it is necessary to make the grafting slit cuts uniformly straight, evenly circumferentially spaced and of a uniform depth, which is difficult when making the cuts by hand with a knife.

SUMMARY OF THE INVENTION

The present invention is a tool for making uniform straight cuts evenly circumferentially spaced and of a preselected depth on the end of a selected tree limb or trunk for performing a conventional banana-type graft.

In a preferred embodiment, a hand-held tool for making such grafting-flap cuts in the bark of a tree limb or trunk is disclosed and includes an elongated tubular body member having a first open end for accommodating coaxial insertion of the limb, and having a handle portion adjacent the end opposite the first open end, the first end including a plurality of elongated slots longitudinally disposed in the tubular body member and circumferentially equally-spaced in parallel relation to each other. One end of each of the slots terminates adjacent the open end of the body member.

A plug member is disposed coaxially within the tubular body member and positioned a pre-selected distance from the open end of the body member for engaging the end of the coaxially inserted limb and limiting the insertion depth of the limb to a preselected distance. The tool further includes a plurality of elongated knife members having first and second ends interconnected by an elongated central section, with the first end having a sharp knife edge disposed on a lower longitudinal edge thereof and communicating with said first end. The longitudinal axis of each of the knife members registers with the longitudinal axis of one of the circumferentially spaced slots in said tubular body member for orienting the first end, the knife edge and a portion of the knife central section in registration with each of the parallel slots.

The knife members are supported by a support ring radially projecting from the outer surface of the tubular body member intermediate the first and second ends. The ring has a plurality of circumferentially spaced and radially projecting slots communicating with the outer edge of the ring and registering with one of the longitudinally disposed knife members for accepting the knife member central section at a selected pivot point. A pin is adapted for transverse insertion through registering apertures disposed through opposite sides of the radial slots in the support ring and an aperture disposed through the knife member at the pivot point for permitting limited rotational movement of the knife member with respect to the support ring.

The handle end of the tubular body member is externally threaded and the second end of each of the knife members is angled towards the handle end and terminates in a cam surface. A collar nut, internally threaded, is adapted for threadably mating with the externally threaded surface of the body member handle end, and has a vertical cross-sectional configuration of a truncated cone having a predetermined shoulder angle for engaging the cam surfaces of the second ends of the knife members for applying a radially outward force to the second ends of the knife members and camming the ends of the knife members upwardly to pivot the knife member first ends downwardly through the registering slots in the tubular body member.

The tool further includes a biasing means, such as an elastic band, that is coaxially disposed about the tubular body member and engages the second ends of the knife members for biasing the second ends radially inwardly towards the tubular body member and biasing the first end and knife edge radially upwardly in the registered slot in the body member to retract the knives from the slots.

Accordingly, one primary feature of the present invention is to provide a hand-held grafting tool that can uniformly and simultaneously cut a plurality of parallel grafting flap slits in the end of a selected plant or tree limb.

Another feature of the present invention is to provide a hand-held grafting tool that can accommodate a variety of tree limb diameters and uniformly make a plurality of grafting flap slits therein.

Still another feature of the present invention is to provide a hand-held grafting tool that can cut a plurality of parallel grafting flap slits that are circumferentially evenly spaced about the selected tree limb.

Yet another feature of the present invention is to provide a hand-held grafting tool that is adjustable to selectively cut grafting slits of a uniform pre-selected depth in a tree limb.

BRIEF DESCRIPTION OF THE DRAWINGS

In order that the manner in which the above-recited advantages and features of the invention are attained and can be understood in detail, a more particular description of the invention may be had by reference to specific embodiments thereof which are illustrated in the accompanying drawings, which drawings form a part of this specification.

In the drawings.

DETAILED DESCRIPTION OF THE PREFERRED EMBODIMENTS

Figure 1:
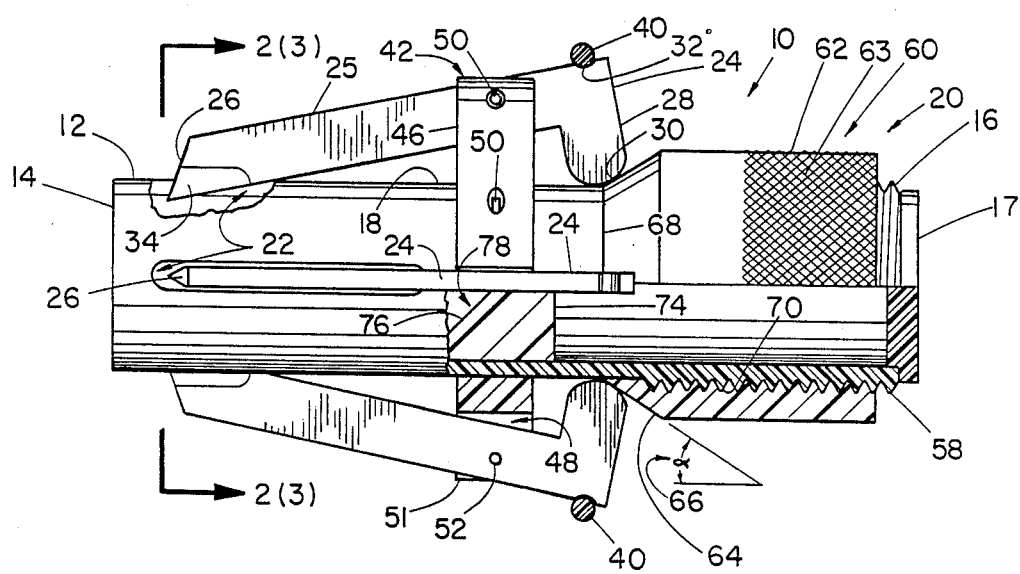
FIG. 1 is a side elevational view of one embodiment of the hand-held grafting tool according to this invention, partly in cross-section.
Figure 2:
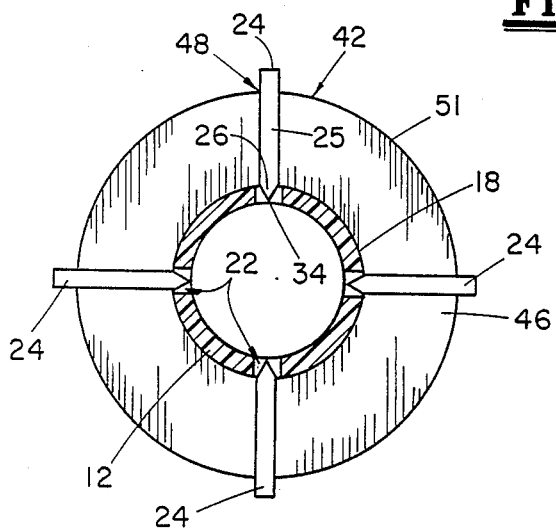
FIG. 2 is a vertical cross-sectional view of the tool shown in FIG. 1 taken along lines 2—2 and including four knife members for making a four (4) flap grafting cut.
Figure 3:
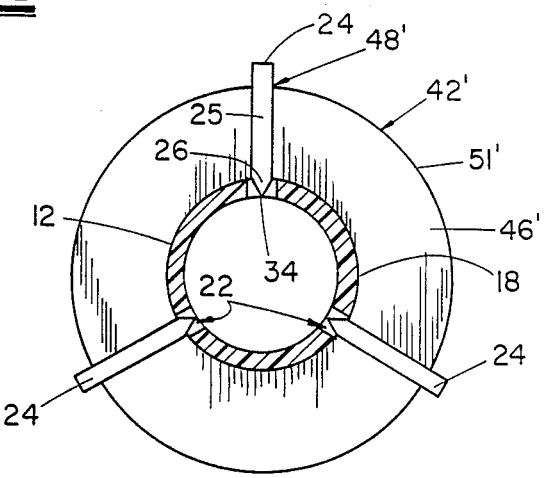
FIG. 3 is a vertical cross-sectional view of another embodiment of the tool shown in FIG. 1 when taken along lines 2—2 and including three knife members for making a three (3) flap grafting cut.

Referring now to FIGS. 1, 2 and 3, one embodiment of the grafting apparatus is shown. A hand-held tool 10 is shown including an elongated tubular body member 12 having a first open end 14 and a second opposite end 16. End 16 may be left open or closed by means of a closure plug 17. The opposite ends 14 and 16 of the tubular body member 12 are inter-connected by an intermediate body portion 18. The tubular body member 12 has an inner diameter selected to accommodate coaxial insertion of a selected tree limb or trunk as will be hereinafter further described. As used herein, the term "limb" will include a selected tree limb or trunk portion of a young tree having the desired diameter for grafting. In practice, the maximum diameter of most graft limbs is about one inch (1.0 inches), generally ranging in size from about three-eights inch (0.375 inches) to about three-quarters inch (0.75 inches). Of course, the inner diameter of member 12 can be sized to any desired diameter consistent with the function of the tool.

The body member 12 further has a handle section 20 disposed adjacent the end 16 and is externally threaded at 58 for purposes to be hereinafter further explained. A plurality of elongated slots 22 are longitudinally disposed in the body member 12 in the intermediate portion 18. The slots are circumferentially equally-spaced in parallel relation around the tubular body member 12. The number of slots 22 is equal to the number of "cuts" or "slits" that are desired to be made in the bark layer of the limb, and equal to the number of bark flaps that are desired in the grafting procedure. For some smaller diameter limbs, only three (3) flaps may be necessary, but in most cases, a four (4) flap cut is most desirable. One end of each of the longitudinally disposed slots 22 is spaced adjacent the open end 14 of the tool. The tubular body member 12 is preferably constructed of a hard and durable plastic material, such as polyvinyl chloride (PVC). Of course, member 12 may be made of any suitable material that is light weight and durable, including metal.

Support means 42 comprising a radially projecting support ring 46 is positioned centrally of the tool 10 on the intermediate portion 18 The support ring has disposed therein a plurality (equal to the number of slots 22) of radially disposed openings or slots 48 that communicate with the outer edge 51 of the ring. The slots 48 are circumferentially equally-spaced about the support ring 46 and are longitudinally aligned with the tubular body member slots 22 for purposes to be hereinafter further explained. The ring 46 is preferably constructed of a hard durable material that is capable of being machined into the desired configuration and will have the necessary strength for being drilled and supporting the cutting knife members as will be hereinafter further explained. A hard polyvinyl chloride (PVC) plastic has been found ideal, although any other material that has suitable characteristics may also be utilized. The ring 46 may be mounted in position by any suitable mounting means, such as by mechanical means such as screws or pins (not shown) or secured with an appropriate P/C adhesive or cement.

A plurality of knife members 24 are provided for cutting the graft flap slits. Each knife member 24 has a first end 26 and a second opposite end 28, interconnected by an elongated central section or portion 25. The first end 26 has a sharp knife edge 34 disposed on a lower edge of the knife member 24 and communicates with the first end 26. The longitudinal axis of each knife member 24 is disposed in registration with the longitudinal axis of the registered body member slots 22 and the support ring slots 48. Knife members 24 are disposed longitudinally through the radial slots 48 of the support ring 46, with the first end 26 projecting forwardly toward the body member open end 14 and the second end 28 projecting rearwardly toward the handle section 20. Each knife member 24 is mounted for limited rotational motion with respect to the support ring 46 about a pivot axis 52, and is mounted for such rotational motion by means of a pin 50 disposed through registering apertures in the walls of the ring 46 (adjacent the slots 48) and in the knife members 24 at pivot point 52. The pin 50 is preferably a roll pin, but may be any other suitable rod or axle structure providing a rotational axis for the knife member 24.

The knife member 24 has a generally "L-shaped" second end 28 that terminates in a convex cam surface 30 for reasons to be hereinafter explained in greater detail. The angled second end 28 generally projects rearwardly toward the handle section 20. A shallow slot or groove 32 is disposed on the upper outer surface of the knife member 24 adjacent the second end 28. An elastic ring or band 40 is sized to be coaxially disposed over the body member 12 and the projecting ends 28 of the knife members and engage the grooves 32 to hold the band 40 in place. The band 40 acts as a biasing means that cooperates with the second ends 28 of the knife members for providing a force for biasing the second ends 28 of the plurality of knife members 28 radially inwardly toward the tubular body member central portion 18. This biasing of the second ends 28 radially downwardly will bias the first knife end 26 and the sharp blade edge 34 upwardly through the slots 22, thus retracting the knife sharp edges 34. Of course, a spring or a plurality of springs may be substituted for the elastic band or ring 40 to provide the biasing force acting radially inwardly on the knife member second ends 28 in the same manner as the elastic band 40.

As may particularly be seen in FIG. 1, with the camming surface 30 of the second end 28 in contact with the body member central portion 18, the first end 26 and the sharp knife edge 34 are registered in longitudinal alignment with respective slots 22 and project slightly downwardly therein. If the second end 28 is forced radially outwardly against the bias means for purposes that will be hereinafter further explained, then as the knife member 24 pivots about the axis pin 50, the first end 26 will be forced radially inwardly into the interior of the tubular body member through slots 22. The knife edges 34 will engage and cut the necessary plurality of circumferentially equally-spaced flap slits in the selected limb.

The knife blades 24 are preferably constructed of a hard metal that will retain a sharp cutting edge through a great number of bark slitting operations, such as stainless steel. Of course, any other suitable knife material may be used to practice the invention.

A plug element or stop means 74 is disposed within the interior of the body member 12 for engaging the end of the coaxially inserted limb and limiting the depth of insertion of the limb. The upstream face of the plug 74 has a conical surface 76 disposed thereon for forming a conical recess 78. The conical recess 78 and cooperating conical face 76 act to "self-center" the end of the limb when it engages the stop member 74. The stop member is preferably constructed of PVC, similar to the other components, and is mounted within the interior of the body member 12 by any conventional attaching means such as a plastic adhesive or glue. Of course, the stop 74 may be constructed of any other conventional and suitable material.

An adjustable collar means 60 comprises a generally cylindrical nut or collar 62 cooperating with the handle end 20 of the body member 12 Collar 60 is movably adjustable axially along the handle portion. The interior of the nut 62 is threaded to mate with the external threads 58 disposed on the handle portion 20 and permit the nut 62 to be moved axially with respect to the tubular body member handle portion 20. The end of nut 62 facing the support ring 46 has a slanted shoulder 64 that terminates in a leading edge 68. When the nut 62 is moved rearwardly toward end 16 almost to its limit, the camming surfaces 30 of the second ends 28 of the knife members 24 engage the outer portion 18 of the intermediate body section 20. As the nut or collar 62 is rotated forward toward the support ring 46, the camming surfaces 30 of the knife member second ends 24 engage first the leading edge 68 and then the slanted shoulder 64 as the forward movement of the collar is continued.

As the nut or collar 62 is moved forward, the conically-shaped forward shoulder 64 applies an upward lifting force to the ends 28 of the knife members 24 against the resistance of the biasing means 40. As shoulder 64 moves forward, the knife camming surface 30 rides up on the shoulder incline thus lifting the second end 28 of the knife and pivoting the knife about the pivot point 52. As the second end 28 is forced up, the first end 26 carrying the knife edge 34 is rotated downward into the slot 22 and into the interior of the body member 12 to contact the limb to be cut (not shown). The nut 62 is adjusted forwardly until the knife blade edges 34 uniformly penetrate the limb not shown) to a desired depth for effecting the flap cuts. The tool 10 is then grasped by the collar 60 and handle end 20 and withdrawn coaxially straight from the end of the limb to effect a plurality of straight flap cuts through the bark or outer layers of the limb covering.

The nut or collar 62 is preferably constructed of a tough durable plastic material such as nylon, and the mating threads 70 are cut at a close tolerance with the handle threads 58 for smooth even rotational motion threads without any looseness or play. The angle "α" at 66 of shoulder 64 is preferably in the range of 15°-60°, with a preferred angle of 30°-45° providing a proper angle for the size and configuration of the tool and cutting knives.

The stop plug 74 is mounted to position the plug at a desired depth for limiting the depth of insertion of the tree limb. The stop 74 insures that each limb will have flap cuts that are substantially equal in length, the only variable occurring depending on the diameter of the limb and at what point it self-centers on the conically-shaped face 76. In general, the depth from the open end 14 of the tool to the stop plug 74 is in the range of 2-3 inches, the usual desired length of the grafting flap cuts.

In FIG. 3, a three-bladed variation of the four-bladed tool 10 is shown. The body member 12 and knives 24 are identical to those above-described and carry identical reference numbers. However the support means 42' comprises a radially extending ring 46' that only includes three radial slots 48' for accommodating three knife members 24. The three blade arrangement as shown in FIG. 3 may preferably be used in a tool 10 having a smaller diameter tubular body member 12 for accommodating smaller diameter limbs. Of course, it is apparent that the tool 10 may be constructed to utilize any number of knives consistent with a desired grafting technique, and limited by the size (diameter) of the tool itself.

Figure 4:
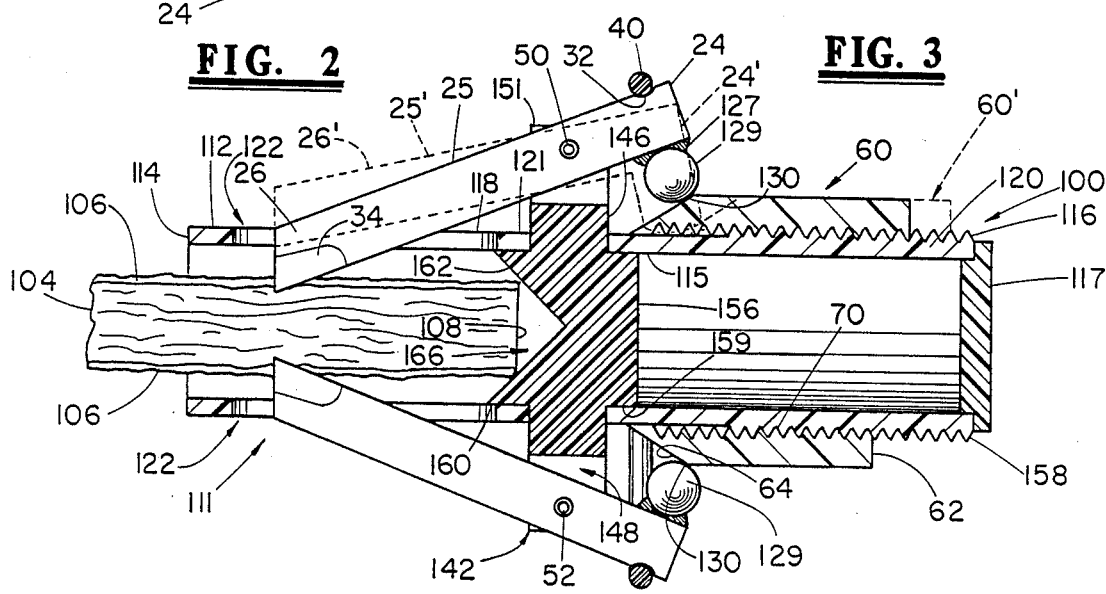
FIG. 4 is a longitudinal vertical cross-sectional view of a second embodiment of the hand-held tool.

FIG. 4 illustrates another embodiment 100 of the present invention. The function of grafting tool 100 is identical to the function of tool 10 hereinabove described with some structural modifications. The tool 100 comprises a body means 111 that includes a pair of tubular body sections 112 and 120 that are mounted on a centrally disposed supporting disc 142. The tubular body section 112 has a first open end 114 and an opposite end 121 joined by an intermediate portion 118. End 121 is attached to a forward flange ring 160 of the support disc 142. Similarly, tube 120 has an end 116, which may be left open or closed as shown by a disc-like plug 117, and an opposite end 115 adapted for mounting on a rearwardly projecting flange ring 159 of the support means 142 comprising a disc 156. The tubes and disc 156 may be constructed of any suitable material, but as above described for the first embodiment, it is preferred to have the tubes 112 and 120 and disc 156 constructed of a plastic material, such as PVC. The ends 117 and 115 of tubes 112 and 120, respectively, may be attached to the projecting flanged rings 160 and 159, respectively, by any suitable means, such as by a conventional plastic adhesive or glue.

The support disc means 142 comprises a disc-like body 156 having a pair of oppositely-facing flanged rings 160 and 159 for coaxial insertion into the ends 117 and 115 of the tubes 112 and 120, as hereinabove described. A radially projecting support ring portion 146 radially projects above the outer surfaces of the tubular body member sections 112 and 20 and has an outer circumferential edge 151. The ring 146 has a plurality of radially extending slots 148 disposed therein in an equally spaced-apart circumferential relationship to accommodate the plurality of knife elements 24 in the identical manner as hereinabove described.

The outer surface of the handle section 120 of body member 111 is threaded to accept an internally threaded collar means 60 comprising nut or collar 62, identical to the collar/nut 62 above described for the embodiment disclosed in FIG. 1. The forward face of disc 156 has a conically-shaped bore 166 disposed coaxially in the forward flanged ring portion 160. The conically-shaped bore 166 is formed by tapered shoulders 162 that act to "self-center" the end 108 of the selected limb 104 when inserted coaxially into the tube section 112 through the open end 114. In the embodiment shown in FIG. 4, a modification of the knife member 24 is shown. The construction of the knife member 24 is identical in all respects to the knife members 24 hereinabove described, except that the "L-shaped" second end is formed by welding at 127 a stainless steel ball 129 to the lower edge of end 24, the outer surface 130 of which provides the cam surface for contacting the collar adjusting means 60 as hereinabove described for the first embodiment. In all other respects, the construction and operation of the knife members 24 are identical in this embodiment as the corresponding structural elements shown in the embodiment above described, and, accordingly, no additional description of the structural or function of those portions of the knife member 24 is deemed necessary.

In addition, since the construction and operation of the biasing means 40 and the adjusting collar means 60 are identical in this embodiment to the corresponding structural elements shown in the embodiment described above for FIG. 1, no additional description of those components is necessary.

In operation, the "squared-off" end 108 of a limb 104 is coaxially inserted into the forward body tube portion 112 through open end 114 into contact with the conically tapered surfaces 162 disposed in the support disc 156. The position of the nut 62 and the knife members 24 will be generally as shown by the dotted lines at 60' and 24', respectively. Then nut 62 is rotated to move the nut forward on the threads 158 of the handle portion 120 until the conical surfaces 64 engage the cam surfaces 130 of the knife member second ends 128. Continued forward rotation of the collar nut 62 engaging the cam surfaces 130 applies upward and outward force on the second ends of the knife members 24 to rotate the second ends upwardly about the pivot point 52.

Pivoting ends upwardly causes knife ends 26 and a portion of the knife body 25 to be rotated down through slots 122 and into contact with the end of limb 104. Continued forward rotation of nut 62 applies additional forces to knife ends and forces the sharp knife edges 34 of the plurality of knife members 24 through the bark or outer layer 106 of the limb 104 as shown. The relative forces between nut 62, knife ends and the knife edges 34 engaging the limb 104 will cause the nut 62 to selflock, thus maintaining the relative position and depth of penetration of the knives into the limb 104. The user, grasping the nut 62 and handle end 120 of the body member 111, can now pull the tool 100 away from the end of the limb 104 in a straight, quick movement, and the sharp knife edges 34 of the knives 24 will cut the desired grafting flap slits or cuts in the limb 104.

Numerous variations and modifications may be made in the structure herein described without departing from the present invention. Accordingly, it should be clearly understood that the forms of the invention herein described and shown in the figures of the accompanying drawings are illustrative only and are not intended to limit the scope of the invention.

I claim:

1. A hand-held tool for making grafting-flap cuts in the bark of a limb of a selected woody plant, comprising
   body means having axially aligned tubular ends including a first open end for accommodating coaxial insertion of the limb therein, and including a handle portion adjacent the end opposite said first open end, the tubular portion adjacent said first open end including a plurality of elongated slots longitudinally disposed therein and circumferentially equally spaced in parallel relation therearound, one end of said slots terminating adjacent said open end,
   stop means cooperating with said body means for engaging the end of the inserted limb and limiting the depth of insertion thereof to a preselected depth,
   a plurality of elongated knife members having first and second ends interconnected by an elongated central section, said first end having a sharp knife edge disposed on a lower longitudinal edge thereof and communicating with said first end, said longitudinal axis of each of said plurality of knife members registering with the longitudinal axis of one of said plurality of circumferentially spaced slots in said tubular body member for orienting said first end and said knife edge and a portion of said knife central section in registration with each of said parallel slots,
   support means cooperating with said body means for supporting each of said knife members in a radially spaced relation to said body means in longitudinal axial registration with one of said plurality of slots, said support means mounting each of said knife members about a pivot point transversely disposed in said central section for permitting limited rotational movement of said knife member thereabout,
   biasing means cooperating with said second ends of said plurality of knife members for biasing said second ends radially inwardly toward said body means and retracting said sharp knife edges upwardly into said slots, and
   force exerting means cooperating with said handle end of said body means and selectively movable longitudinally in relation thereto for engaging said second ends of said plurality of knife members and applying forces thereagainst opposing said bias means for pivoting each of said knife members upwardly about said pivot point for rotating said first end and said sharp knife edges thereof downwardly through said elongated slots in said tubular body means for engaging the limb inserted coaxially into said body means in a predetermined circumferentially spaced relationship, said force exerting means being further adjustable to apply sufficient forces on said knife member second ends for forcing said sharp knife edges into the limb to a pre-selected depth,
   wherein when said body means handle end is manipulated for coaxially withdrawing said body means from the end of the limb, said plurality of sharp knife edges will cut a plurality of parallel grafting-flap cuts in said limb.

2. The tool described in claim 1, wherein said body means comprises a continuous tubular body member having said first open end and an opposite end joined by an intermediate tubular section disposed therebetween.

3. The tool described in claim 1, wherein said stop means comprises a plug member disposed coaxially within said tubular body member and positioned a preselected distance from said first open end for engaging the end of the coaxially inserted limb and limiting the insertion depth thereof to a preselected distance.

4. The tool as described in claim 3, wherein said plug member further includes a concave conically-tapered surface axially disposed in the face of said plug member facing said first open end of said tubular body member for engaging the end of the limb for acting to self-center the limb coaxially within said tubular body member.

5. The tool as described in claim 2, wherein said knife member second end is adapted for camming engagement with said force exerting means for pivoting said second end upwardly and moving said first end of said knife member into said elongated slot disposed in said body member.

6. The tool as described in claim 5, wherein said knife member second end comprises a portion projecting from said elongated central portion to form a generally "L" shaped knife configuration, the projecting free end of said projecting portion having a rounded cam surface for engaging said force exerting means.

7. The tool as described in claim 5, wherein said knife member second end comprises a spherical member attached to an end of said elongated central portion and projecting therefrom to form a generally "L"-shaped knife configuration, the projecting rounded surface of said spherical member adapted for engaging said force exerting means.

8. The tool as described in claim 2, wherein said biasing means includes means for applying a preselected force radially inwardly to said second ends of said knife members for biasing said second ends thereof downwardly towards said body member.

9. The tool as described in claim 8, wherein said means comprises an elastic band coaxially disposed about said tubular body member and engaging each of said knife member second ends for biasing said second ends thereof downwardly towards said tubular body member.

10. The tool as described in claim 2, wherein said support means comprises
   a radially projecting support ring positioned on the outer surface of said tubular body member intermediate said first and second ends, said ring having disposed therein a plurality of radially projecting slots circumferentially equally-spaced thereabout, each of said slots registering with one of said longitudinally disposed knife members and accepting said knife member central section at said pivot point thereof, and
   pivot means cooperating with said pivot point and said support ring for supporting said knife member for limited rotational movement about said pivot axis in relation to said support ring.

11. The tool as described in claim 10, wherein said pivot means comprises a pin adapted for transverse insertion through registering apertures disposed through opposite sides of said radial slots in said support ring and an aperture disposed through said knife member at said pivot point.

12. The tool as disclosed in claim 2, wherein said handle end of said tubular body member is externally threaded and said second end of each of said knife members has an angled portion projecting toward said handle end and terminates in a rounded cam surface.

13. The tool as described in claim 12, wherein said force exerting means comprises an internally threaded nut adapted for threadably mating with the externally threaded surface of said body member handle end, said nut having a generally cylindrical vertical cross-sectional configuration and having a shoulder means adapted for engaging said cam surfaces of said knife member second ends and applying upward and outward forces to said second ends against said biasing means for camming said second ends upwardly to pivot said knife member first ends downwardly through said elongated slots.

14. The tool as described in claim 13, wherein said shoulder means comprises a conically-shaped shoulder disposed on the forward end of said nut for engaging said camming surfaces of said knife members second ends.

15. The tool as described in claim 14, wherein said conical shoulder angle is selected in a range between 15° and 60° relative to the longitudinal axis of said tubular body member.

16. The tool as described in claim 1, wherein said body means, stop means and support means comprise
   a first tubular body member having a pair of open ends and including said plurality of elongated slots longitudinally disposed therein and circumferentially equally spaced in parallel relation therearound,
   a second tubular body member forming said handle portion and having at least one open end,
   a disc-like member having a pair of coaxial cylindrical flanged sections projecting from opposite sides of said disc-like member, one of said cylindrical flanged sections adapted for insertion into one of said open ends of said first tubular body member for mounting said member thereto and leaving said first tubular body member with one open end for accepting coaxial insertion of the limb, the other one of said cylindrical flanged sections adapted for insertion into said at least one open end of said second tubular body member for mounting said member thereto and in coaxial alignment with said first tubular body member,
   the central portion of said disc-like member comprising
   a support ring section radially projecting above the outer surfaces of said first and second tubular body members and having disposed therein a plurality of radially projecting slots circumferentially equally-spaced thereabout, each of said slots registering with one of said longitudinally disposed knife members and accepting said central section at said pivot point thereof, and
   pivot means cooperating with said pivot point and said support ring section for supporting said knife member for limited rotational movement about said pivot axis in relation to said support ring section.

17. The tool as described in claim 16, wherein said pivot means comprises a pin adapted for transverse insertion through registering apertures disposed through opposite sides of said radial slots in said support ring and an aperture disposed through said knife member at said pivot point.

18. The tool as described in claim 17, wherein said one of said cylindrical flanged sections of said disc-like member mounting said first tubular body member is adapted for engaging the end of the coaxially inserted limb and limiting the insertion depth thereof to a preselected distance.

19. The tool as described in claim 16, wherein said one of said cylindrical flanged sections mounting said first tubular body member further includes a concave conically-tapered surface axially disposed therein and facing said open end of said first tubular body member for engaging the end of the limb and self-centering the limb coaxially within said first tubular body member.

20. The tool as described in claim 16, wherein said knife member second end is adapted for camming engagement with said force exerting means for pivoting said second end upwardly and moving said first end of said blade member into said registered slot disposed in said first body member.

21. The tool as described in claim 16, wherein said biasing means includes means for applying a preselected force radially inwardly to said second ends of said knife members for biasing said second ends thereof downwardly towards said second tubular body member.

22. The tool as described in claim 21, wherein said means comprises an elastic band coaxially disposed about said second tubular body member and engaging each of said knife member second ends for biasing said second ends thereof downwardly towards said second tubular body member.

23. The tool as disclosed in claim 16, wherein said second tubular body member is externally threaded and said second end of each of said knife members is angled toward said second tubular body member and terminates in a rounded cam surface.

24. The tool as described in claim 23, wherein said force exerting means comprises an internally threaded nut adapted for threadably mating with the externally threaded surface of said second body member, said nut having a generally cylindrical vertical cross-sectional configuration and having a shoulder means adapted for engaging said cam surfaces of said knife member second ends and applying upward and outward forces to said second ends against said biasing means for camming said second ends upwardly to pivot said knife member first ends downwardly through said registering slots.

25. The tool as described in claim 24, wherein said shoulder means comprises a conically-shaped shoulder disposed on the forward end of said nut for engaging said camming surfaces of said knife members second ends.

26. The tool as described in claim 25, wherein said conical shoulder angle is selected in a range between 15° and 60° relative to the longitudinal axis of said second tubular body member.

* * * * *